United States Patent
Hommeltoft

(10) Patent No.: US 8,685,880 B2
(45) Date of Patent: Apr. 1, 2014

(54) ON-SITE DRYING OF AQUEOUS SALT FOR IONIC LIQUID MAKE-UP

(75) Inventor: Sven Ivar Hommeltoft, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 270 days.

(21) Appl. No.: 13/167,446

(22) Filed: Jun. 23, 2011

(65) Prior Publication Data

US 2012/0004096 A1 Jan. 5, 2012

Related U.S. Application Data

(60) Provisional application No. 61/360,004, filed on Jun. 30, 2010.

(51) Int. Cl.
*B01J 31/02* (2006.01)
*B01J 27/125* (2006.01)

(52) U.S. Cl.
USPC .......................................... 502/164; 502/100

(58) Field of Classification Search
None
See application file for complete search history.

(56) References Cited

U.S. PATENT DOCUMENTS

| 7,432,408 B2 | 10/2008 | Timken et al. |
| 7,495,144 B2 | 2/2009 | Elomari et al. |
| 7,675,739 B2 | 3/2010 | Ewing |
| 7,723,556 B2 | 5/2010 | Elomari et al. |

OTHER PUBLICATIONS

Babai et al, Anhydrous Praseodymium Salts in the Ionic Liquid [bmpyr][Tf2N]: Structural and Optical Properties of [bmpyr]4[PrI6][Tf2N] and [bmyr]2[Pr(Tf2N)5], 2005, chem. materials, 17, pp. 6230-6238.*

* cited by examiner

*Primary Examiner* — Melvin C Mayes
*Assistant Examiner* — Stefanie Cohen
(74) *Attorney, Agent, or Firm* — Steven H. Roth

(57) ABSTRACT

Methods for amending the composition of catalyst inventory of ionic liquid catalyzed processes, whereby the catalytic activity of the catalyst inventory may be adjusted and maintained for the steady state operation of such processes by contacting the catalyst inventory with a liquid phase, catalyst make-up material comprising an anhydrous salt and/or a mixture of the ionic liquid with the salt, wherein the salt comprises a precursor of the ionic liquid.

16 Claims, 1 Drawing Sheet

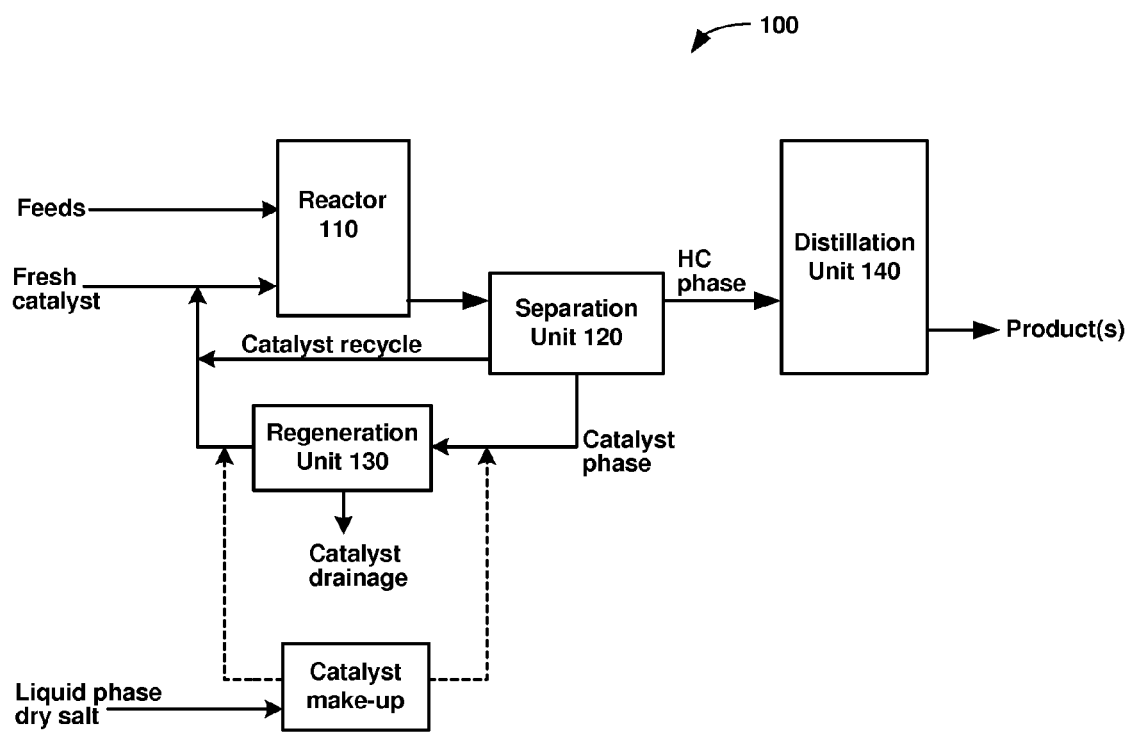

ON-SITE DRYING OF AQUEOUS SALT FOR IONIC LIQUID MAKE-UP

This application claims the benefit of U.S. Provisional Application No. 61/360,004 filed Jun. 23, 2010.

FIELD OF THE INVENTION

The present invention relates to on-site drying of aqueous salt for ionic liquid make-up.

BACKGROUND OF THE INVENTION

Ionic liquids are a class of fused salt compositions that are liquid at low temperatures, with melting points often below room temperature. In general, such compositions have found applications as catalysts, solvents and electrolytes. Metal halide ionic liquid catalysts are attractive in many refinery process applications where the liquid catalyst is easily mixed with the reactants in a reactor, and readily separated from hydrocarbon products in a settler.

As a result of their use in catalytic reactions, ionic liquids may become partially inactivated or spent. Following catalyst deactivation, catalytic activity can be maintained by draining a quantity of the partially spent catalyst and adding a relatively large volume of fresh ionic liquid as make-up material. However, due to the expense of ionic liquids, the volume of fresh ionic liquid make-up material should be minimized on economic grounds.

Methods for the regeneration of ionic liquid catalysts by treatment with a regeneration metal are disclosed in U.S. Pat. No. 7,674,739 to Elomari, et al. A consequence of such treatment is that excess metal halide may accumulate in the ionic liquid. U.S. Pat. No. 7,674,739 further discloses the removal of excess metal halide from an ionic liquid by the addition of either an organic halide salt or a mixed salt, corresponding to the ionic liquid, having a metal halide/salt molar ratio less than two.

During the regeneration of, for example, a spent chloroaluminate ionic liquid catalyst using aluminum metal, aluminum trichloride is produced as part of the regeneration chemistry. Using N-butylpyridinium heptachlorodialuminate as an example of an ionic liquid catalyst, the target $AlCl_3$/N-butylpyridinium chloride molar ratio is two. In this case, the "excess" aluminum trichloride formed during catalyst regeneration can be accommodated by the addition of N-butylpyridinium chloride (a hygroscopic solid).

The use of the salt precursor (e.g., N-butylpyridinium chloride) as make-up material, as opposed to using the ionic liquid itself (N-butylpyridinium heptachlorodialuminate), would be advantageous in requiring a lesser amount of make-up material. However, it is generally preferred to use liquid feeds rather than solids in large scale continuous processes operating under pressure. Handling a hygroscopic salt, such as N-butylpyridinium chloride, would be particularly problematic.

A salt such as N-butylpyridinium chloride may be liquefied by adding a little water to provide a relatively benign aqueous solution. However, an aqueous solution of the salt precursor is unsuitable as make-up material due to the need to avoid the introduction of water into the plant. Drying of aqueous salt solutions typically involves precipitation of the solid salt, the handling of which would be undesirable. Consequently the challenge of converting the aqueous solution to the anhydrous salt on-site by a convenient and preferably continuous method remains.

There is a need for methods for adjusting and maintaining the catalyst inventory of ionic liquid catalyzed processes for the steady state operation of such processes. There is a further need for preparing make-up material for amending ionic liquid catalyst inventory in a cost-effective and convenient manner.

SUMMARY OF THE INVENTION

The present invention is directed to methods for amending the composition of catalyst inventory of ionic liquid catalyzed processes. The present invention is further directed to methods for efficiently preparing make-up material for catalyst inventory, wherein the make-up material comprises an anhydrous form of a salt component of an ionic liquid. The present invention is also directed to methods for maintaining the catalytic activity of catalyst inventory of ionic liquid catalyzed processes.

In an embodiment, the present invention provides a method for amending a catalyst composition, the method comprising providing an aqueous solution of a salt; removing water from the aqueous solution to provide an anhydrous form of the salt; and contacting the anhydrous form of the salt with an ionic liquid, wherein the salt may comprise a precursor of the ionic liquid.

According to another embodiment of the present invention there is provided a method for maintaining the catalytic activity of a catalyst composition, the method comprising providing an aqueous solution of a salt; removing water from the aqueous solution to provide an anhydrous form of the salt; maintaining the anhydrous form of the salt in the liquid phase; and adding the anhydrous form of the salt, in the liquid phase, to the catalyst inventory of a hydrocarbon conversion system. The catalyst inventory may comprise an ionic liquid. The salt may comprise a precursor of the ionic liquid, and the salt may be selected from the group consisting of salts of the general formulas A, B, C, and D:

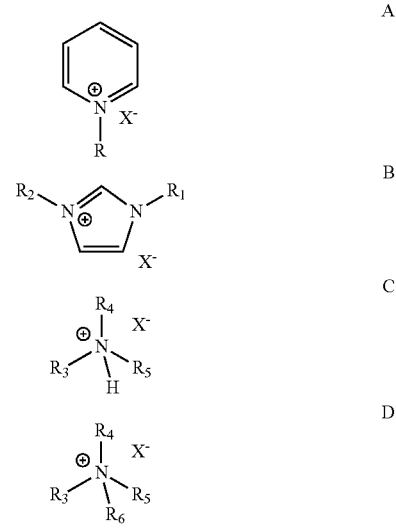

wherein X is halide, each of R, $R_1$, and $R_2$=H, methyl, ethyl, propyl, butyl, pentyl, hexyl or a heavier alkyl or aryl group, wherein $R_1$ and $R_2$ may or may not be the same; and each of $R_3$, $R_4$, $R_5$, and $R_6$=methyl, ethyl, propyl, butyl, pentyl, hexyl or a heavier alkyl or aryl group, wherein $R_3$, $R_4$, $R_5$, and $R_6$ may or may not be the same.

BRIEF DESCRIPTION OF THE DRAWINGS

FIG. 1 is a block diagram representing a scheme for an ionic liquid catalyzed hydrocarbon conversion process, according to an embodiment of the present invention.

DETAILED DESCRIPTION OF THE INVENTION

In an embodiment, the present invention provides methods for preparing an anhydrous salt for amending the composition of the catalyst inventory of ionic liquid catalyzed processes, whereby the catalytic activity of the catalyst inventory may be adjusted and maintained for the steady state operation of such processes.

Salts as Ionic Liquid Catalyst Precursors

Acidic Ionic liquids may be used as catalysts for various acid-catalyzed reactions, including hydrocarbon conversion reactions. Ionic liquids catalysts may be prepared, for example, by mixing a Lewis acid metal halide such as aluminum trichloride with an organic halide salt, such as a hydrocarbyl substituted pyridinium halide, imidazolium halide, tetraalkylammonium halide, or trialkylammonium hydrohalide.

Following catalyst regeneration processes involving treatment of partially spent catalyst with a regeneration metal to form an excess amount of the metal halide, the corresponding organic halide salt may be used as a precursor for forming fresh ionic liquid.

In an embodiment, the catalyst precursor may be a salt of the general formulas A, B, C, and D:

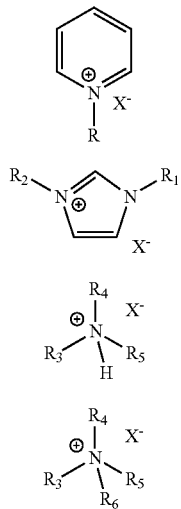

wherein X is halide, each of R, $R_1$, and $R_2$=H, methyl, ethyl, propyl, butyl, pentyl, hexyl or a heavier alkyl or aryl group, wherein $R_1$ and $R_2$ may or may not be the same; and each of $R_3$, $R_4$, $R_5$, and $R_6$=methyl, ethyl, propyl, butyl, pentyl, hexyl or a heavier alkyl or aryl group, wherein $R_3$, $R_4$, $R_5$, and $R_6$ may or may not be the same. In an embodiment, the salt may be an alkylpyridinium chloride or an alkylimidazolium chloride. In a sub-embodiment, the salt may be N-butylpyridinium chloride.

In an embodiment, the salt may be a hygroscopic solid under ambient conditions. Handling solids is generally to be avoided for continuous processes in a refinery setting. Furthermore, due to the presence of HCl in the system, it is necessary to avoid the introduction of water to extend the longevity of the system components. Therefore handling the salt as the hygroscopic solid, without risking water uptake by the salt and the introduction of water into the system, is problematic.

Applicant has now discovered that an aqueous solution of a salt may be conveniently converted into an anhydrous form as liquid phase make-up material for adjusting the catalyst inventory of hydrocarbon conversion processes. Such processes may involve the regeneration of at least a portion of the ionic liquid catalyst inventory. In an embodiment, the salt may be added to the catalyst inventory before, during, or after catalyst regeneration.

Drying Aqueous Salt Solutions for Catalyst Make-up

According to an aspect of the present invention, an anhydrous liquid phase catalyst make-up material may be prepared from an aqueous solution comprising a salt selected from salts of the general formulas A, B, C, and D, supra. The aqueous salt solution provided for drying may have a concentration in the range from about 50 to 95 wt %, typically from about 72 to 85 wt %, and often from about 75 to 85 wt %.

Water may be removed from the aqueous solution by any suitable method, which may be selected based on various factors such as the required residence time, temperature, energy consumption, and the like. The method may be chosen or tailored so as to allow for the rapid removal of water from the aqueous solution at a temperature below the decomposition point of the salt. As non-limiting examples, water may be removed from the aqueous solution by methods such as stripping, flash evaporation, film evaporation, and the like, or by a combination of such methods.

The removal of water from the aqueous salt solution by stripping may involve the use of a dry gas or vapor as a stripping agent. In an embodiment, the salt may be dried using a continuous process performed in a packed stripping column. As non-limiting examples, the stripping agent may be selected from the group consisting of air, nitrogen, or a $O_3$ to $C_{10}$ hydrocarbon. In an embodiment, the water may be stripped from the aqueous salt with a stripping agent comprising a condensable alkane having a boiling point at ambient pressure in the range from about −10° C. to +170° C.

Typically, removing the water from the aqueous salt may involve countercurrent flow of the stripping agent with respect to the flow of the aqueous solution. The stripping operation may be performed at ambient pressure, reduced pressure, or elevated pressure. In an embodiment, the stripping procedure may be performed at a temperature above the melting point of the anhydrous salt. In an embodiment, the anhydrous form of the salt may have a melting point of about 130° C., and the stripping may be performed at a temperature above about 130° C., typically above about 135° C., and often at a temperature in the range from about 135° C. to 190° C.

In another embodiment, the aqueous salt may be dried at reduced pressure without the use of a stripping agent. As a non-limiting example, the aqueous salt may be flashed in a heat exchanger, allowing the water to escape in the vapor phase while the anhydrous salt is collected in the liquid phase. In a further embodiment, a film evaporation method for removing water from the aqueous salt solution may be selected from falling film evaporation, rising film evaporation, wiped film evaporation, or a combination thereof. Wiped film evaporation may also be referred to as forced- or agitated thin-film evaporation. Such evaporation methods are well known in the art.

In an embodiment the anhydrous form of the salt, prepared according to various methods under the instant invention, may be combined with or added to a suitable quantity of ionic liquid to form an ionic liquid/salt mixture. In an embodiment, the ionic liquid/salt mixture may have an ionic liquid:salt molar ratio generally in the range from about 10 to about 0.5, typically from about 5 to about 0.5, and often from about 1.5 to about 0.5. In an embodiment, the ionic liquid/salt mixture prepared according to the present invention may have a melting point of not more than about 20° C., whereas the anhydrous form of the salt may have a melting point above about 125° C.

In an embodiment, the anhydrous form of the salt may be combined with a suitable quantity of fresh ionic liquid to provide the ionic liquid/salt mixture. In another embodiment, the anhydrous form of the salt may be combined with used ionic liquid to form the ionic liquid/salt mixture. Such used ionic liquid may comprise the catalyst inventory of a hydrocarbon conversion process. The anhydrous form of the salt may also be combined directly, e.g., as neat, molten anhydrous salt, with the ionic liquid catalyst inventory at a location upstream or downstream from a regeneration unit of a hydrocarbon conversion system (see, e.g., FIG. 1).

Amendment of Catalyst Compositions

An ionic liquid composition may be amended by contacting an anhydrous form of the salt with the ionic liquid. The anhydrous form of the salt may be prepared by removing water from an aqueous solution of the salt, wherein the salt comprises a precursor or component of the ionic liquid. In an embodiment, the ionic liquid composition may comprise the catalyst inventory of a hydrocarbon conversion process, and contacting the anhydrous form of the salt with the ionic liquid may involve contacting the anhydrous form of the salt with the catalyst inventory.

In an embodiment, contacting the anhydrous form of the salt with the ionic liquid may involve contacting the anhydrous form of the salt with fresh ionic liquid to form an ionic liquid/salt mixture. Such a mixture may then be used as make-up material for addition to the catalyst inventory. The ionic liquid/salt mixture to be added to the catalyst inventory may have an ionic liquid:salt molar ratio generally in the range from about 10 to about 0.5. The ionic liquid/salt mixture may be added to the catalyst inventory at a temperature above or below the melting point of the anhydrous form of the salt.

In another embodiment, the anhydrous form of the salt may be added to the catalyst inventory as a pure or substantially pure molten salt, e.g., at a temperature generally in the range from about 5° C. to 60° C. above the melting point of the anhydrous form of the salt, and typically from about 5° C. to 30° C. above the melting point of the anhydrous form of the salt.

In an embodiment, the ionic liquid catalyst inventory may comprise a chloroaluminate, such as N-butylpyridinium heptachlorodialuminate, and the anhydrous form of the salt (i.e., N-butylpyridinium chloride) may be added to the catalyst inventory, at a temperature in the range from about 130° C. to 190° C., and in an amount sufficient to provide an AlCl$_3$/salt molar ratio of about 2.

In another embodiment, the present invention provides a method for maintaining the catalytic activity of a catalyst composition. As a non-limiting example, the catalyst composition may comprise the catalyst inventory of an ionic liquid catalyzed hydrocarbon conversion process. A method for maintaining the catalytic activity of a catalyst composition according to an embodiment of the present invention may include: i) providing an aqueous solution of a salt; ii) removing water from the aqueous solution to provide an anhydrous form of the salt; iii) maintaining the anhydrous form of the salt in the liquid phase; and iv) adding the anhydrous form of the salt, in the liquid phase, to the catalyst inventory of the hydrocarbon conversion system. The salt may comprise a precursor of the ionic liquid. In an embodiment, the salt may be selected from the group consisting of salts of the general formulas A, B, C, and D:

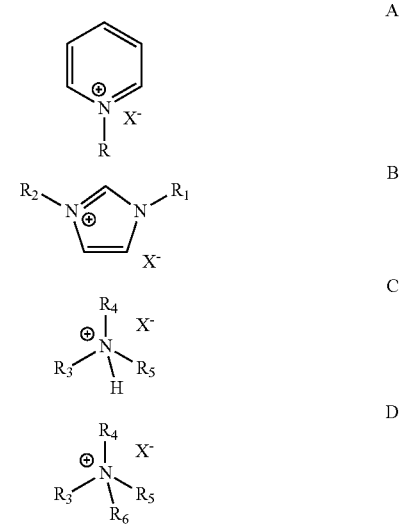

wherein X is halide, each of R, R$_1$, and R$_2$=H, methyl, ethyl, propyl, butyl, pentyl or hexyl, wherein R$_1$ and R$_2$ may or may not be the same; and each of R$_3$, R$_4$, R$_5$, and R$_6$=methyl, ethyl, propyl, butyl, pentyl, hexyl or a heavier alkyl or aryl group, wherein R$_3$, R$_4$, R$_5$, and R$_6$ may or may not be the same.

In an embodiment, the salt may be combined with a suitable quantity of the ionic liquid to provide an ionic liquid/salt mixture as make-up material, and the ionic liquid/salt mixture may be added to the catalyst inventory in an amount sufficient to provide steady state catalytic activity of the hydrocarbon conversion system. Naturally, an amount of the ionic liquid/salt mixture added to the catalyst inventory may be adjusted according to parameters such as the catalyst regeneration rate, the rate of catalyst inventory drainage, and the rate of addition of fresh catalyst to the catalyst inventory.

In an embodiment, the anhydrous form of the salt may be added to the catalyst inventory of a hydrocarbon conversion system (see, e.g., FIG. 1) at a location downstream from the separator and upstream from the reactor. In a sub-embodiment, the anhydrous form of the salt may be added to the catalyst inventory at a location downstream from the separator and upstream from the regeneration unit. In yet another embodiment, the anhydrous form of the salt may be added to the catalyst inventory at a location downstream from the regeneration unit and upstream from the reactor. In an embodiment, the catalyst inventory exiting the regeneration unit may be at a temperature in the range from about 75° C. to 125° C., typically from about 80° C. to 120° C., and often from about 90° C. to 110° C. It is to be understood that the invention is not limited to the addition of catalyst make-up material at a particular point in an ionic liquid catalyzed process.

Hydrocarbon Conversion Systems

According to an embodiment of the present invention, an anhydrous salt prepared from an aqueous salt solution may be used as make-up material for adjusting the composition of a catalyst inventory of a hydrocarbon conversion system or process. With reference to FIG. 1, an ionic liquid catalyzed hydrocarbon conversion system 100 may include a reactor 110, a separator or separation unit 120, a regeneration unit 130, and a distillation unit 140. Reactor 110 may be in fluid communication with separation unit 120. Separation unit 120 may be in fluid communication with catalyst regeneration unit 130 and with distillation unit 140. Regeneration unit 130 may be in fluid communication with reactor 110.

During an ionic liquid catalyzed hydrocarbon conversion process, dry feeds may be introduced into reactor 110. The dry feeds may include one or more reactants and a catalyst promoter (e.g., anhydrous HCl or an alkyl halide). The reactant(s) may be introduced into reactor 110 via one or more reactor inlet ports (not shown). Fresh ionic liquid catalyst may be introduced into reactor 110 via a separate inlet port (not shown). Reactor 110 may be vigorously stirred to promote contact between reactant(s) and ionic liquid catalyst. Reactor conditions may be adjusted to optimize process performance for a particular hydrocarbon conversion process of the invention.

During hydrocarbon conversion processes of the invention, reactor 110 may contain a mixture comprising ionic liquid catalyst and a hydrocarbon phase. The hydrocarbon phase may comprise one or more hydrocarbon products. The ionic liquid catalyst may be separated from the hydrocarbon phase via separation unit 120. At least a portion (e.g., generally in the range from about 5% to 95%) of the heavier ionic liquid catalyst phase may be recycled directly to reactor 110. Another portion of the ionic liquid catalyst may be fed to regeneration unit 130 for catalyst regeneration. The degree or severity of catalyst regeneration may be adjusted, e.g., by varying the proportion of the ionic liquid phase fed to regeneration unit 130.

The hydrocarbon phase from separation unit 120 may be fed to distillation unit 140. Distillation unit 140 may represent or comprise a plurality of distillation columns. According to one aspect of the instant invention, distillation unit 140 may be adjusted, e.g., with respect to temperature and pressure, to provide one or more hydrocarbon products from the hydrocarbon phase under steady state distillation conditions. The hydrocarbon products from distillation unit 140 may be further treated, as appropriate, to remove any trace impurities from the final product(s). As a non-limiting example, a hydrocarbon conversion process of the instant invention may comprise an alkylation process, e.g., for alkylate gasoline production.

The catalytic activity of reactor 110 may be maintained under steady state conditions by monitoring the catalytic activity, and by adjusting process parameters, such as the degree of catalyst regeneration, the amount of catalyst drainage, the amount of fresh ionic liquid introduced, and combinations thereof, according to the monitored catalytic activity. The catalytic activity may be gauged by monitoring the concentration of conjunct polymer in the ionic liquid catalyst phase. In an embodiment, the catalytic activity may also be monitored by analysis of one or more hydrocarbon products (see, e.g., U.S. Pat. No. 7,432,408, the disclosure of which is incorporated by reference herein).

Catalyst Deactivation and Regeneration

With continued operation of conversion system 100, the ionic liquid catalyst may tend to become partially inactivated or spent. Catalyst inactivation is associated with the formation of conjunct polymer in the ionic liquid phase, for example, as disclosed in commonly assigned U.S. Pat. No. 7,674,739, the disclosure of which is incorporated by reference herein in its entirety. To circumvent any substantial decrease in catalytic activity, a portion of the catalyst inventory may be fed to regeneration unit 130 for catalyst regeneration. In an embodiment, the catalyst inventory may be regenerated in regeneration unit 130 by contact with a suitable regeneration metal, such as Al, Ga, In, Tl, Zn, Cd, , , , and mixtures thereof.

The regeneration metal may be selected based on the composition of the particular catalyst, e.g., to prevent contamination of the catalyst with unwanted metal complexes or intermediates. As an example, aluminum metal may be used for the regeneration of chloroaluminate ionic liquid catalysts. Thereafter, the regenerated ionic liquid catalyst may be recycled to reactor 110. Processes for the regeneration of ionic liquid catalyst are disclosed, e.g., in U.S. Pat. No. 7,674,739, incorporated by reference herein.

During the regeneration of, for example, a spent chloroaluminate ionic liquid catalyst using aluminum metal, aluminum trichloride is produced as part of the regeneration chemistry. Using N-butylpyridinium heptachlorodialuminate as a non-limiting example of an ionic liquid catalyst, the target $AlCl_3$/N-butylpyridinium chloride molar ratio is two. As an example, the amount of metal halide (e.g., $AlCl_3$) produced during regeneration of the ionic liquid catalyst can be quantified by measuring the consumption of Al metal; then, an amount of anhydrous salt needed to react with the excess aluminum trichloride can be determined. Similarly, an amount of ionic liquid/salt mixture needed to react with the excess aluminum trichloride can be determined based on the molar ratio of the ionic liquid/salt mixture. According to various embodiments of the invention, the catalyst make-up material, comprising anhydrous salt or an ionic liquid/salt mixture, may be added to the catalyst composition prior to, concurrently with, or after treatment of the catalytic composition with the regeneration metal.

Ionic Liquid Catalyzed Hydrocarbon Conversion Processes

Methods of the present invention may be used for adjusting and/or maintaining the catalytic activity of a range of hydrocarbon conversion processes. Such processes may include, without limitation, paraffin alkylation, paraffin isomerization, olefin isomerization, olefin dimerization, olefin oligomerization, olefin polymerization and aromatic alkylation (see, e.g., U.S. Pat. Nos. 7,432,408, and 7,723,556, the disclosures of which are incorporated by reference herein).

In an embodiment, feed stocks for such hydrocarbon conversion processes may comprise various refinery streams, e.g., streams containing isoparaffins or olefins. Examples of olefin containing streams include FCC light ends (typically C3-C5), coker light ends, olefin metathesis unit light ends, polyolefin gasoline unit light ends, and methanol to olefin unit light ends.

In an embodiment, hydrocarbon conversion processes that may be performed in conjunction with the present invention may use a chloroaluminate ionic liquid prepared by mixing $AlCl_3$ and a hydrocarbyl substituted pyridinium halide, imidazolium halide, trialkylammonium hydrohalide, or tetraalkylammonium halide, as disclosed in commonly assigned U.S. Pat. No. 7,495,144, the disclosure of which is incorporated by reference herein in its entirety.

Due to the low solubility of hydrocarbons in ionic liquids, hydrocarbon conversion reactions in ionic liquids are generally biphasic and occur at the interface in the liquid state. The volume of ionic liquid catalyst in the reactor may be generally in the range from about 2 to 70 vol %, and usually from about 5 to 50 vol %. Generally, vigorous stirring is used to ensure good contact between reactants and catalyst. The reactor temperature may be generally in the range from about $-40°$ C. to $+150°$ C., typically from about $-0°$ C. to $+100°$ C., and often from about $+5°$ C. to $+40°$ C. The reactor pressure may be in the range from atmospheric pressure to about 8000 kPa. Typically, the reactor pressure is sufficient to keep the reactants in the liquid phase.

Residence time of reactants in the reactor may generally be in the range from a few seconds to hours, and usually from about 0.5 min to 60 min. In the case of ionic liquid catalyzed isoparaffin-olefin alkylation, the reactants may be introduced in an isoparaffin:olefin molar ratio generally in the range from about 1 to 100, more typically from about 2 to 20, and often from about 24 to 14. Heat generated by the reaction may be dissipated using various means well known to the skilled artisan.

The following examples are illustrative of the present invention, but are not intended to limit the invention in any way beyond what is contained in the claims which follow.

EXAMPLES

Example 1

Synthesis of Solid N-butylpyridinium Chloride Salt

N-butylpyridinium chloride (a solid) was prepared according to the following procedure. In a two-liter Teflon-lined autoclave, 400 gm (5.05 mol.) anhydrous pyridine (99.9% pure purchased from Aldrich) were mixed with 650 gm (7 mol.)1-chlorobutane (99.5% pure purchased from Aldrich). The neat mixture was sealed and left to stir at 145° C. under autogenic pressure overnight. Then, the autoclave was cooled down to room temperature, vented, and the resultant mixture was transferred to a three-liter round bottom flask. Chloroform was used to rinse the liner and dissolve the stubborn crusty product that adhered to the sides of the liner. Once all transferred, the mixture was concentrated at reduced pressure on a rotary evaporator (in a hot water bath) to remove excess chloride, unreacted pyridine, and the chloroform rinse. The obtained tan solid product was further purified by dissolving in hot acetone and precipitating the pure product through cooling and addition of diethyl ether. Filtering and drying under vacuum and heat on a rotary evaporator gave 750 gm (88% yield) of the desired product as an off-white shiny solid. $^1$H-NMR and $^{13}$C-NMR were ideal for the desired N-butylpyridinium chloride and no presence of impurities was observed by NMR analysis.

Example 2

Preparation of N-Butylpyridinium Heptachlorodialuminate Ionic Liquid

N-butylpyridinium heptachlorodialuminate is a room temperature ionic liquid prepared by mixing neat N-butylpyridinium chloride (Example 1) with neat (solid) aluminum trichloride in an inert atmosphere according to the following procedure. The N-butylpyridinium chloride was dried under vacuum at 80° C. for 48 hours to get rid of residual water (N-butylpyridinium chloride is hygroscopic and readily absorbs water upon exposure to air). 500 gm (2.91 mol.) of the dried N-butylpyridinium chloride were transferred to a two-liter beaker in a nitrogen atmosphere in a glove box. Then, 777.4 gm (5.83 mol.) of anhydrous powdered AlCl$_3$ (99.99% from Aldrich) were added in small portions (while stirring) to control the temperature of the highly exothermic reaction. Once all the AlCl$_3$ was added, the resulting amber-looking liquid was left to gently stir overnight in the glove box. The liquid was then filtered to remove any undissolved AlCl$_3$.

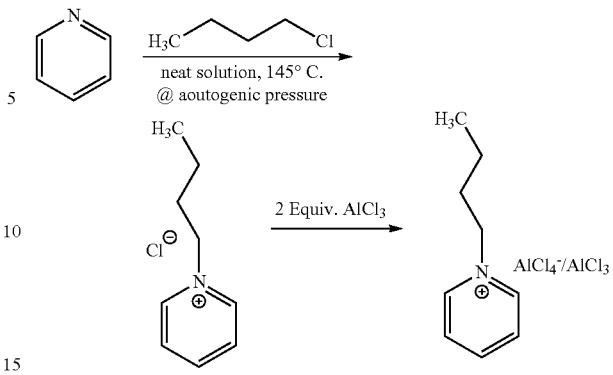

The N-butylpyridinium heptachlorodialuminate (C$_5$H$_5$C$_4$H$_9$Al$_2$Cl$_7$) ionic liquid catalyst, which may be used in alkylation and other hydrocarbon conversion processes according to various aspects of the present invention, had the following composition: 12.4 Wt % Al, 56.5 Wt % Cl, 24.6 Wt % C, 3.2 Wt % H, 3.3 Wt % N.

Example 3

Laboratory Preparation of Anhydrous N-Butylpyridinium Chloride from Aqueous Solution by Countercurrent Stripping An aqueous solution (80 wt % of N-butylpyridinium chloride (Example 1) is prepared by slowly adding 1.0 molar equivalents of water to crystalline N-butylpyridinium chloride under ambient conditions. A 10 mm internal diameter helical glass coil is heated to 174° C. by directing a stream of condensing n-decane over its external surface. A stream of dry nitrogen gas is fed vertically upwards from the bottom of the coil. While the nitrogen gas continues to flow upwards within the coil, the aqueous solution of N-butylpyridinium chloride is introduced at the top of the coil and flows down through the heated coil in countercurrent flow with the nitrogen gas. The resultant wet nitrogen gas escapes from the top of the coil, while the dried salt is collected in an empty flask beneath the coil where it rapidly solidifies. The recovered anhydrous N-butylpyridinium chloride is determined by NMR analysis in D$_2$O to contain less than 0.1 wt % water.

The procedure of Example 3 is repeated, except the anhydrous salt is collected in a flask containing ionic liquid (N-butylpyridinium heptachlorodialuminate) to provide an ionic liquid/salt mixture having an ionic liquid:salt molar ratio in the range from about 10 to about 0.5. The mixture remains in the liquid phase upon storage at ambient temperature and is stable.

Example 4

Continuous Drying of Aqueous Salt Solution in a Stripping Column

An aqueous solution (ca. 80 wt %) of an n-butylpyridinium chloride is uniformly sprayed on top of a packed bed within the stripping column. At the same time hexane vapor (180° C.) is introduced at a lower portion of the column beneath the packed bed. Water is removed from the salt solution by the rising hexane vapor to provide anhydrous molten salt at the base of the column at a temperature of about 150° C. A mixture of water vapor and hexane vapor is fed via the top of the column to a condenser. The condensate is fed to a phase separator to provide waste water and hexane, the latter for recycling to the column via a heater. Portions of the anhydrous salt are added, in the liquid phase, to the catalyst inventory of an ionic liquid catalyzed hydrocarbon conversion process as catalyst make-up material to adjust the composition of the catalyst inventory for steady state operation of the process.

Example 5

Drying Aqueous Salt Solution Using a Thin-film Evaporator

An aqueous solution (ca. 80 wt %) of an organic halide salt (ionic liquid precursor) is introduced into an upper portion of a heated chamber at reduced pressure and elevated temperature. A rotor within the chamber distributes the solution as a thin film within the chamber. Waste water is removed from the top portion of the chamber via a condenser and vacuum source, while anhydrous liquid salt is collected at the base of the chamber at a temperature of about 150° C. Portions of the anhydrous liquid salt are added to the catalyst inventory of an ionic liquid catalyzed hydrocarbon conversion process, as described in Example 4.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A method for amending a catalyst composition, comprising:
   a) providing an aqueous solution of a salt selected from the group consisting of salts of the general formulas A, B, C, and D:

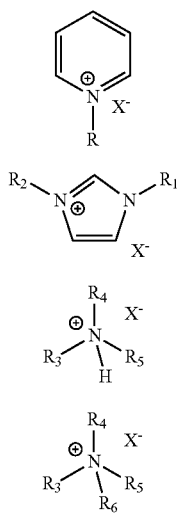

wherein X is halide, each of R, $R_1$, and $R_2$=H, methyl, ethyl, propyl, butyl, pentyl or hexyl or a heavier alkyl or aryl group, wherein $R_1$, $R_2$ may or may not be the same; and each of $R_3$ $R_4$ $R_5$ and $R_6$=methyl, ethyl, propyl, butyl, pentyl, hexyl or a heavier alkyl or aryl group, wherein $R_3$, $R_4$, $R_5$ and $R_6$ may or may not be the same;

b) removing water from the aqueous solution to provide an anhydrous form of the salt; and
   c) adding the anhydrous form of the salt to an ionic liquid, wherein the salt comprises a precursor of the ionic liquid.

2. The method according to claim 1, wherein the aqueous solution of the salt provided in step a) has a concentration in the range from about 50 to 95wt %.

3. The method according to claim 1, wherein step b) comprises removing the water from the aqueous solution by a method selected from the group consisting of stripping, flash evaporation, film evaporation, and combinations thereof.

4. The method according to claim 3, wherein the film evaporation comprises falling film evaporation or forced film evaporation.

5. The method according to claim 3, wherein the stripping is performed at a temperature above the melting point of the anhydrous form of the salt.

6. The method according to claim 1, wherein step b) comprises stripping the water from the aqueous solution of the salt with a stripping agent, wherein the stripping agent flows countercurrently to the aqueous solution.

7. The method according to claim 1, wherein step b) comprises stripping the water from the aqueous solution of the salt with a stripping agent selected from the group consisting of air, nitrogen, and a $C_3$ to $C_{10}$ hydrocarbon.

8. The method according to claim 1, wherein step b) comprises stripping the water from the aqueous solution of the salt with a stripping agent comprising a condensable alkane having a boiling point at ambient pressure in the range from about −10° C. to +170° C.

9. The method according to claim 1, wherein step c) comprises combining the anhydrous form of the salt with the ionic liquid to form an ionic liquid/salt mixture having an ionic liquid:salt molar ratio in the range from about 10 to about 0.5.

10. The method according to claim 1, wherein the salt comprises N-butylpyridinium chloride.

11. A method for amending a catalyst composition, comprising:
   a) providing an aqueous solution of a salt;
   b) removing water from the aqueous solution to provide an anhydrous form of the salt; and
   c) adding the anhydrous form of the salt to the catalyst inventory of an ionic liquid catalyzed hydrocarbon conversion system, wherein the salt comprises a precursor of the ionic liquid.

12. The method according to claim 11, wherein:
   the hydrocarbon conversion system includes a reactor, a separator, and a catalyst regeneration unit,
   the catalyst regeneration unit is located downstream from the separator and upstream from the reactor, and
   step c) comprises adding the anhydrous form of the salt to the catalyst inventory at a location downstream from the separator and upstream from the reactor.

13. The method according to claim 12, wherein step c) comprises adding the anhydrous form of the salt to the catalyst inventory at a location downstream from the regeneration unit and upstream from the reactor.

14. The method according to claim 11, wherein the anhydrous form of the salt is added to the catalyst inventory in an amount sufficient to provide an $AlCl_3$/salt molar ratio of about 2.

15. A method for maintaining the catalytic activity of a catalyst composition, comprising:
   a) providing an aqueous solution of a salt;
   b) removing water from the aqueous solution to provide an anhydrous form of the salt;

c) forming an ionic liquid/salt mixture; and d) adding the ionic liquid/salt mixture to the catalyst inventory of a hydrocarbon conversion system in an amount sufficient to provide steady state catalytic activity of the hydrocarbon conversion system, wherein the catalyst inventory comprises an ionic liquid, the salt comprises a precursor of the ionic liquid, and wherein the salt is selected from the group consisting of salts of the general formulas A, B, C, and D:

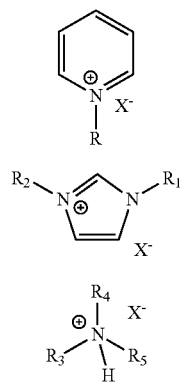

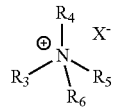

wherein X is halide, each of R, $R_1$, and $R_2$=H, methyl, ethyl, propyl, butyl, pentyl, hexyl or a heavier alkyl or aryl group, wherein $R_1$ and $R_2$ may or may not be the same; and each of $R_3$, $R_4$, $R_5$, and $R_6$=methyl, ethyl, propyl, butyl, pentyl or hexyl or a heavier alkyl or aryl group, wherein $R_3$, $R_4$, $R_5$, and $R_6$ may or may not be the same.

16. A method for amending a catalyst composition, comprising:

a) providing an aqueous solution of a salt;

b) removing water from the aqueous solution to provide an anhydrous form of the salt having a melting point above about 120° C.; and c) adding the anhydrous form of the salt to an ionic liquid, wherein the salt comprises a precursor of the ionic liquid to form an ionic liquid/salt mixture having a melting point of not more than about 20° C.

* * * * *